United States Patent [19]

Sijbrandij

[11] Patent Number: 4,502,594

[45] Date of Patent: Mar. 5, 1985

[54] SUPPORT FOR A SIDE GUIDE OF A CONVEYING DEVICE

[75] Inventor: George Sijbrandij, Poeldijk, Netherlands

[73] Assignee: Gefra B.V., Gravenzande, Netherlands

[21] Appl. No.: 301,017

[22] Filed: Sep. 10, 1981

[30] Foreign Application Priority Data

Sep. 18, 1980 [DE] Fed. Rep. of Germany ....... 3035371

[51] Int. Cl.³ ............................................ B65G 21/10
[52] U.S. Cl. .................................................. 198/836
[58] Field of Search ...................... 248/257, 285, 289.1; 198/836

[56] References Cited

U.S. PATENT DOCUMENTS

| 1,288,611 | 12/1918 | Jones | 248/285 |
| 2,408,703 | 10/1946 | Talge | 248/285 |
| 2,526,070 | 10/1950 | Early | 248/278 |
| 3,280,962 | 10/1966 | Stone | 198/836 |
| 3,948,475 | 4/1976 | Jones | 248/251 |
| 4,225,035 | 9/1980 | Mohney et al. | 198/830 |
| 4,270,721 | 6/1981 | Mainor | 248/285 |

FOREIGN PATENT DOCUMENTS

| 643463 | 6/1962 | Canada | 248/495 |
| 2808270 | 8/1978 | Fed. Rep. of Germany | 198/836 |
| 2710683 | 9/1978 | Fed. Rep. of Germany | 198/836 |
| 87526 | 9/1957 | Netherlands | 198/836 |
| 411259 | 4/1966 | Switzerland | 248/285 |

Primary Examiner—Reinaldo P. Machado
Assistant Examiner—Alvin Chin-Shue
Attorney, Agent, or Firm—Larson and Taylor

[57] ABSTRACT

Support for a side guide of a conveying device, having a mounting pin, that is adjustable in its longitudinal direction and affixable, said support having a pivot connection in order to allow adjustment of the direction of the pin. Preferably a further pivot connection between the pin and the side guide is provided.

1 Claim, 3 Drawing Figures

SUPPORT FOR A SIDE GUIDE OF A CONVEYING DEVICE

The invention relates to a conveying device specially for bottles or such like, in which the objects to be transported stand on a mainly horizontally moving conveying surface and side guides keep these objects on said surface. In curves of these side guides, which for instance are necessary to shift said objects off said surface or onto a second moving conveying surface located alongside said first moving surface, up till now the difficulty occurred to support said side guide with simple means such that a smooth curve and consequently a transport without pilling up of the objects are obtained.

The invention aims to solve this problem and to procure a support for side guides, that is easily adjustable and adaptable to each curve. This increases the flexibility of the conveying device for different objects in a very essential degree and/or facilitates to use the device in another way without needing special supports that are adapted to the shape or the location of the curve, so that also no special personnel for the switch is necessary.

Known supports are provided with an attaching member, that by means of bolts and oblong holes can be mounted to a support rail fixedly mounted alongside said moving conveying surface, which member in its upper portion is provided with holes in which a mounting pin for the side guide is slidably and affixably mounted.

According to the invention it is envisaged that the support is provided with a pivot connection that allows a rotational movement of a member supporting said mounting pin with respect to said attaching members.

According to an embodiment of the invention it is provided that the attaching member is devided into two parts, which by means of a chockable pivot connection are connected to each other. Preferably this pivot connection is formed by a vertical screw bolt.

This pivot connection can also be used to allow a height adjustment of the support by providing one or more inserts between said parts and around said bolt.

A further advantageous elaboration of the invention exists in that the morning pin is provided with a connection member, that is pivotable about a vertical axis and is adapted to be connected to the side guide.

Though each of these pivot connections, that is to say between the parts of the devided support and between the mounting pin and the side guide, each are already an improvement, it is preferred to combine these two pivot connections, specially in the case that the side guide can only at predetermined locations be connected to the mounting pin, for instance if it is provided with mounting holes. Said two pivot connections permit a connection between the mounting pin and the side guide that is completely free from bending stresses.

The invention in the following is described on hand of the drawing, in which

Figure 1:
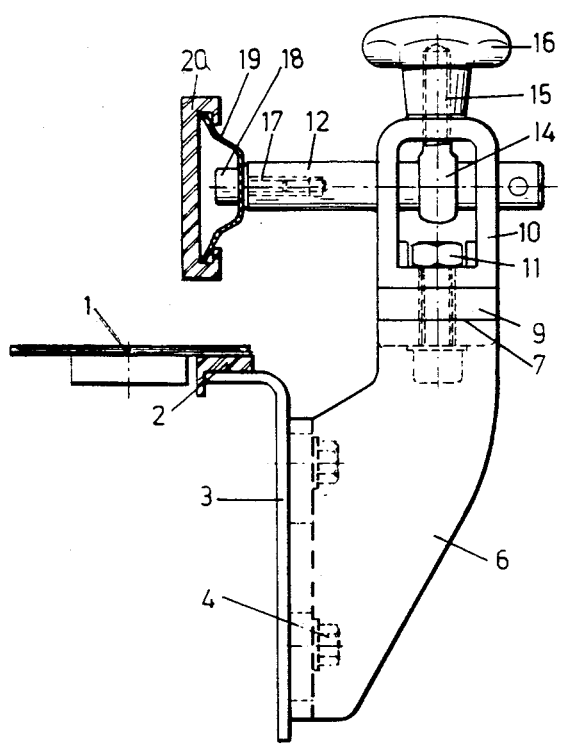
FIG. 1 shows a side view of an embodiment of the support according to the invention.

In FIG. 1 reference 1 indicates a conveying web moving perpendicularly to the plane of the drawing, on the upper side of which not specially shown objects such as bottles are present. A support edge 2 of for instance plastic material is mounted to a longitudinal mounting rail 3. By means of screw bolts 4 and oblong holes 5 the lower or attachment member 6 of the support is mounted. Said attachment member 6 has a horizontal support surface 7 through which a screw bolt 8 passes. An insert member 9 supports the upper member 10; the attachment member 6, the insert member 9 and the upper member 10 can be fastened to each other by means of a nut 11 cooperating with screw bolt 8. A mounting pin 12 having preferably but not necessarily a circular cross section passes through holes 13 and is clamped by means of an eye member 14 that is provided with a screw shank 15 that cooperates with a screw knob 16.

At its left end the mounting pin 12 is provided with a screw hole 17 in which a screw bolt 18 can be screwed. This screw bolt 18 passes through a profile 19 and this profile supports the proper side guide 20 of for instance plastic material.

Figure 3:
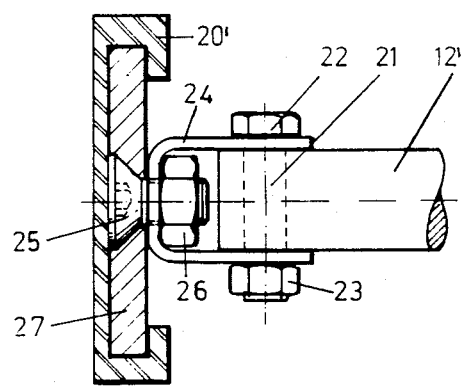
FIG. 3 shows a detail of a second embodiment of the support.

FIG. 3 shows the left end of a mounting pin 12' that is provided with a vertical hole 21, through which a screw bolt 22 passes that by means of a nut 23 fastens a bracket 24, which by means of a bolt 25 and a nut 26 bears a support sheet 27 on which the side guide 20' has been clamped.

Figure 2:
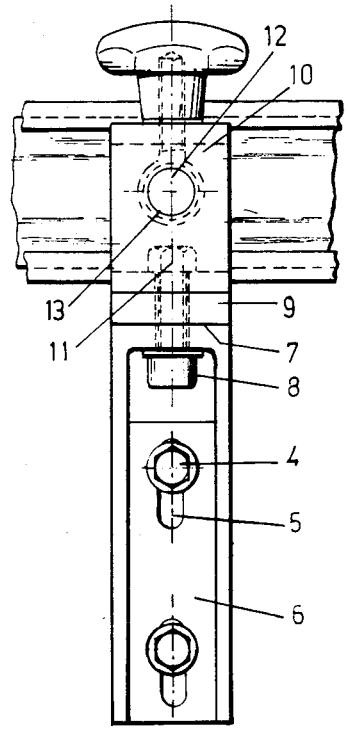
FIG. 2 shows a front view of the support of FIG. 1.

With the embodiment of FIG. 1 and 2 it is possible that the end surface of the mounting pin 12 and the surface of the profile 19 are not positioned in exactly the same plane, so that some bending of the profile may be caused when tightening the bolt 18. This in normal cases is allowable and does not prevent a right adjustment of the side guide. In case the profile 19 is stiff or composed of stiff sheets 27 the solution of FIG. 3 is to be preferred.

What I claim is:

1. A support for a side guide of a horizontal conveying device comprising:

an attaching member which is attached to the conveying device;

a horizontal mounting pin;

a supporting member for mounting said mounting pin to said attaching member, said supporting member including a clampable guide means for allowing free longitudinal movement of said mounting pin when unclamped and for preventing any longitudinal movement of said mounting pin when clamped and a screw knob for clamping and unclamping said guide means;

a pivot connection for allowing free rotational adjustment about a vertical axis of said supporting member and said mounting pin relative to said attaching member, said pivot connection including a chockable vertical screw for frictionally holding said pivot connection immovably after adjustment;

a connection member for connecting the side guide to said mounting pin, said connection member being pivotable about a vertical axis; and a removable insert member of a selected vertical height provided between said attaching member and said supporting member for spacing said supporting member and hence said mounting pin from said attaching member such that the side guide is accurately vertically positioned relative to the particular conveyor device.

* * * * *